United States Patent

Barna

[15] 3,690,012
[45] Sept. 12, 1972

[54] CENTER, DIAMETER AND WALL THICKNESS DETERMINING DEVICE

[72] Inventor: Peter Barna, Box 871, Wilmington, Calif. 90744

[22] Filed: March 22, 1971

[21] Appl. No.: 126,651

[52] U.S. Cl. .............. 33/178 B, 33/168 R, 33/191 R
[51] Int. Cl. ......... G01b 3/04, G01b 5/08, G01b 5/12
[58] Field of Search ......... 33/168 R, 168, 178 B, 191, 33/189

[56] References Cited

UNITED STATES PATENTS

| 2,677,892 | 5/1954 | Schecter | 33/168 R |
| 659,513 | 10/1900 | Dubus | 33/191 X |
| 986,783 | 3/1911 | Tschop | 33/189 |
| 2,243,201 | 5/1941 | Fornelius | 33/191 |

FOREIGN PATENTS OR APPLICATIONS

| 355,062 | 6/1921 | Austria | 33/178 |

Primary Examiner—Leonard Forman
Assistant Examiner—Paul G. Foldes
Attorney—William C. Babcock

[57] ABSTRACT

A portable lightweight, compact device having no moving parts that may be used to determine the internal and external diameters of a tubular cylindrical member, the wall thickness of said tubular member, and the external diameter and longitudinal center of a solid cylindrical body.

4 Claims, 5 Drawing Figures

PATENTED SEP 12 1972 3,690,012

INVENTOR.
PETE BARNA
BY
William G. Bobrock
ATTORNEY ly inwardly towards one another. The plate has a slot formed therein, with a first edge of the slot being normally disposed to the base and axially aligned with the apex. A first set of graduations is imprinted on the plate and preferably extends longitudinally along the first edge of the slot. The plate has two second sets of graduations thereon that extend longitudinally along the sides of the plate. When the device is slipped over a cylindrical member either tubular or solid, with the most adjacent edge portions of the flanges in contact with the external surface thereof, and the plate normally disposed to the longitudinal axis of the member, the external diameter of the cylindrical member will be the reading on the first set of graduations that is transversely aligned with the portion of the cylindrical member most remote from the apex.

Upon it being desired to determine the internal diameter of a tubular member having an end edge that is normal to the longitudinal axis of the member, the device is extended inwardly into the tubular member, and adjusted to have the end edge of the tubular member transversely indicate the same reading on the two second graduations. When the device is so disposed in a tubular member, the reading on either one of the two sets of second graduations indicates the internal diameter of that tubular member. When the device is so disposed on an end portion of the tubular member and identical concurrent readings are obtained on the two second sets of graduations, the first edge of the slot is coaxially aligned with the longitudinal axis of the tubular member.

Upon it being desired to obtain the wall thickness of a tubular member, the external and internal diameters thereof are obtained as above described, with the internal diameter then being subtracted from the external diameter and the difference between the two being divided by two.

Occasionally it may be desired to obtain the longitudinal center of a cylindrical body. In that event, the device is disposed on an end surface of the cylindrical body with the flanges in contact with the portions of the external surface thereof. A first diametrical line is inscribed on the end surface of the cylindrical body, with the device then being rotated relative to this first line, and a second diametrical line inscribed on the end surface of the body. The intersection of the two inscribed lines is the longitudinal center of the cylindrical body.

DESCRIPTION OF THE PREFERRED EMBODIMENT

Figure 1:
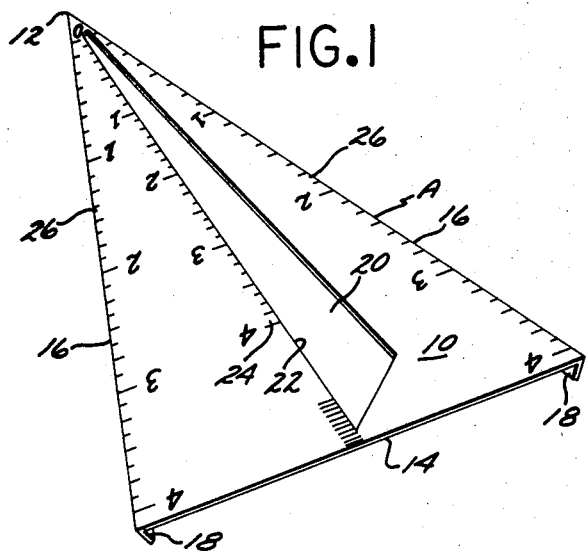
FIG. 1 is a perspective view of the device.
Figure 3:
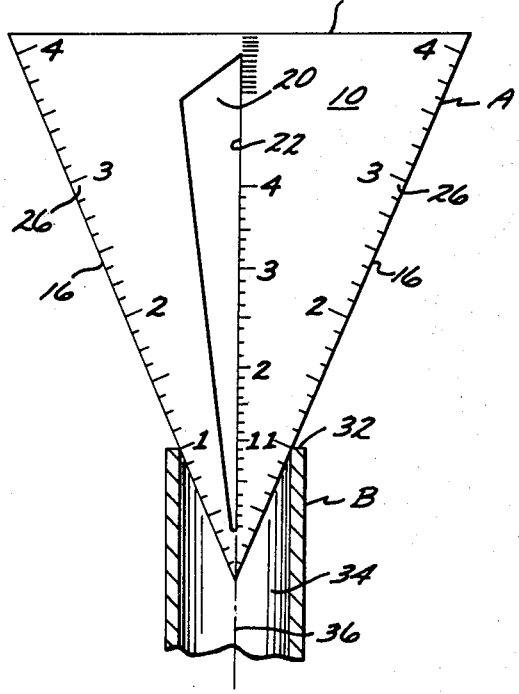
FIG. 3 is a side elevational view of the device being utilized to obtain the internal diameter of a tubular member having an end edge that is normal to the longitudinal axis of the tubular member.

The device A as may best be seen in FIG. 1 includes an isosceles triangle shaped plate 10 formed from a rigid sheet material such as a polymerized resin or the like, with the sheet 10 having an apex 12, base 14 and two equal sides 16. The sides 16 have two flanges 18 of substantial depth that extend outwardly therefrom, and the flanges angling inwardly towards one another to a degree that they will not contact the interior surface of a tubular member B as shown in FIG. 3 when the device A is extended downwardly therein to measure the interior diameter of said tubular member. The plate 10 as best seen in FIG. 1 has a longitudinally extending slot 20 formed therein, and a first edge 22 of this slot being normally disposed to the base 14 and longitudinally aligned with the apex 12.

The plate 10 has a first set of graduations 24 defined thereon, and the first set of graduations preferably extending longitudinally alongside the edge 22 of slot 20.

Plate 10 also has two sets of second graduations 26 thereon that are identical with one another, and the second sets of graduations extending longitudinally along the sides 16.

Figure 2:
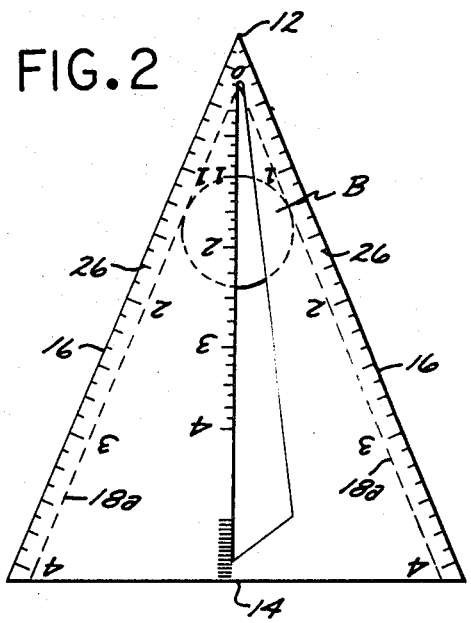
FIG. 2 is a top plan view of the device being used to determine the external diameter of a cylindrical body that is shown in phantom line.

The spacing of the inner adjacent edges 18a of the flanges 18 and the positioning of the first set of graduations 24 are so related that when the device is positioned to extend over an end portion of tubular body B as shown in FIG. 2, with the flange edges 18a in contact with external side portions of the tubular body, the external diameter of the tubular body will be the reading on the first set of graduations that is transversely aligned with the portion of the tubular body most remote from the apex 12.

Figure 4:
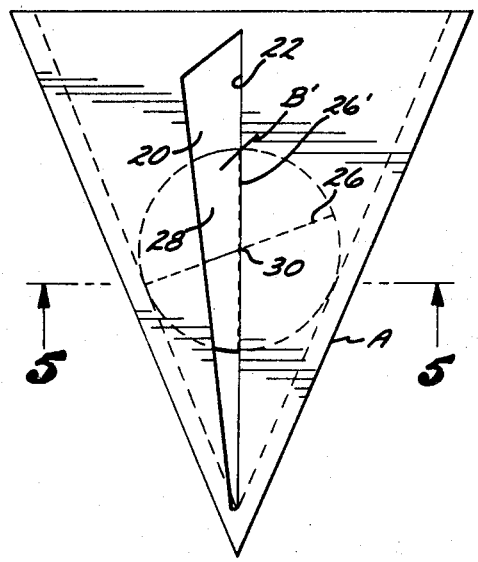
FIG. 4 is a top plan view of the device being utilized to obtain the location of the longitudinal axis of a cylindrical body.
Figure 5:
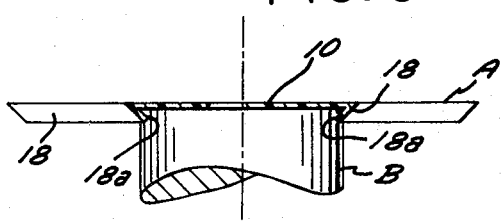
FIG. 5 is a transverse cross sectional view of the device taken on the line 5—5 of FIG. 4.

When the device A is similarly positioned on a solid cylindrical body B', as shown in FIG. 4, the first edge 22 of slot 20 may be used as a guide to inscribe a diametrical line 26 on an end surface 28 of the cylindrical body, with the device A then being rotated to have a second diametrical line 26' inscribed on the surface 28 using the edge 22 as a guide. The intersection of the two diametrical lines 26 and 26' on the end surface 28 at the point 30 is the location of the longitudinal axis of the cylindrical body B'.

When it is desired to obtain the internal diameter of the tubular member B as shown in FIG. 3 that has an end edge 32 that is normal to the longitudinal axis (not shown) of the tubular member, the device A is positioned as shown in FIG. 3. The two second sets of graduations are so located on the plate 10 that when the apex portion of the device A is extended into the bore 34 of the tubular member B to the maximum extent, and adjusted so that the readings on the two second graduations 26 are identical, the internal diameter of the tubular member B will be the reading on either one of the second sets of graduations 26.

Upon the two second sets of graduations 26 being disposed to have the end edge 32 transversely aligned with like readings on the two sets, the first edge 22 of the slot 20 is coaxially aligned with the longitudinal center line of the tubular member B which longitudinal center line is identified by the number 36 in FIG. 3. The slot 20 is preferably of triangular shape, to permit the easy insertion of an inscribing instrument, pencil or the like (not shown) within the confines thereof to be moved longitudinally along the first edge 22 of the slot 20 as shown in FIG. 4.

The instrument A may be formed of any rigid material, but it is convenient to have the instrument formed from a transparent material such as a polymerized resin or the like, and the first set of graduations 24 and the two second sets of graduations 26 inscribed on the plate in a color that is easy to read when the device A is positioned as shown in either FIGS. 2 or 3.

The use and operation of the device A has previously been described in detail, and the operation thereof need not be again repeated.

I claim:

1. A device for use in measuring the external and internal diameters of a tubular member, in determining the wall thickness of said tubular member, and in determining the longitudinal center of a cylindrical body as well as the external diameter of said body, said device including:

a. an isosceles triangle shaped rigid plate that has two sides, an apex and a base, said plate having a slot therein that is normally disposed to said base, with a first edge of said slot aligned with said apex, and said plate having a first and at least one second set of graduations thereon that extend between said apex and base, with said first set of graduations for use in determining the external diameter of a tubular member or cylindrical body and said second set of graduations the internal diameter of a tubular member; and b. two elongate flanges of substantial depth that project from said sides of said plate in the same direction and said flanges angled towards one another, with said first set of graduations indicating the external diameter of a tubular member when the edges of said flanges most adjacent one another are in contact with external surface portions of said tubular member or cylindrical body, said external diameter on said first set of graduations being the reading that is aligned with the surface of said tubular member or cylindrical body most remote from said apex, and said second set of graduations indicating the internal diameter of a tubular member when the apex portion of said plate is extended into an end portion of said tubular member to the maximum extent possible with said first edge of said slot coaxially aligned with the longitudinal axis of said tubular member, with said inside diameter being the reading on said second set of graduations that is transversely aligned with an end edge of said tubular member, which end edge is normal to the longitudinal axis of said tubular member, and the longitudinal center on an end of a cylindrical body being the intersection of two diametrical lines drawn thereon with said first edge of said slot as a guide when said plate rests on said end surface and said flanges movably engage the exterior surface of said cylinder.

2. A device as defined in claim 1 in which at least said plate is formed from a transparent material.

3. A device as defined in claim 1 in which said plate and flanges are formed from a transparent material.

4. A device as defined in claim 1 in which two identical second sets of graduations are provided on said plate that extend longitudinally along said sides thereof, and said two sets of graduations indicating the correct internal diameter of said tubular member when opposite end edge portions of said tubular member are transversely aligned with like readings on said two second sets of graduations.

* * * * *